(12) United States Patent
Lorenz et al.

(10) Patent No.: US 7,559,109 B2
(45) Date of Patent: Jul. 14, 2009

(54) WIPER ARM FOR A WINDOW WIPING DEVICE

(75) Inventors: Karlheinz Lorenz, Baden-Baden (DE); Christian Reiser, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 232 days.

(21) Appl. No.: 10/588,681

(22) PCT Filed: Feb. 14, 2005

(86) PCT No.: PCT/EP2005/050634
§ 371 (c)(1),
(2), (4) Date: Aug. 8, 2006

(87) PCT Pub. No.: WO2005/080159
PCT Pub. Date: Sep. 1, 2005

(65) Prior Publication Data
US 2007/0157412 A1    Jul. 12, 2007

(30) Foreign Application Priority Data
Feb. 20, 2004    (DE) .................. 10 2004 008 331

(51) Int. Cl.
*B60S 1/34* (2006.01)
(52) U.S. Cl. ............... 15/250.352; 15/250.351
(58) Field of Classification Search ........... 15/250.351, 15/250.352, 250.34, 250.202
See application file for complete search history.

(56) References Cited

U.S. PATENT DOCUMENTS

| 4,050,832 | A | | 9/1977 | Stratton et al. |
| 4,947,508 | A | * | 8/1990 | Bauer et al. ............ 15/250.352 |
| 5,423,106 | A | | 6/1995 | Peyret |
| 6,394,688 | B1 | | 5/2002 | Kraemer |
| 2003/0101530 | A1 | | 6/2003 | Weiler |

FOREIGN PATENT DOCUMENTS

| EP | 0 289 658 | 11/1988 |
| FR | 1 423 511 | 3/1966 |

* cited by examiner

*Primary Examiner*—Gary K Graham
(74) *Attorney, Agent, or Firm*—Michael Best & Friedrich LLP

(57) ABSTRACT

Disclosed is a wiper arm (10) for a windshield wiper device, in particular for a motor vehicle. It is comprised of at least one fastening part (12) for fastening the wiper arm (10) to the windshield wiper device, one articulated part (16), which is connected in an articulated manner to the fastening part (12) so as to be moveable in a first plane, one spring element (34), which is arranged between the fastening part (12) and the articulated part (16) and is provided with a tension spring (32) that is stressed during a relative movement between the fastening part (12) and the articulated part (16), and one fastening means (30) connecting the tension spring (32) to the fastening part (12). According to the invention, the fastening means (30) has a U-shaped bend (36), which runs in a second plane that is perpendicular to the first plane.

19 Claims, 2 Drawing Sheets

WIPER ARM FOR A WINDOW WIPING DEVICE

BACKGROUND OF THE INVENTION

The invention relates to a wiper arm for a windshield wiper device, in particular for a motor vehicle.

Numerous wiper arms for windshield wiper devices are known. These normally feature a fastening part, which serves to fasten the wiper arm to a wiper shaft of the windshield wiper device of the motor vehicle and executes a pendulum movement during operation. An articulated part is coupled to the fastening part so that the articulated part is able to move in a plane perpendicular to the plane of the pendulum movement. Provided between the articulated part and the fastening part is a spring element, which includes a tension spring, which is stressed during a relative movement between the fastening part and the articulated part. The spring element is used primarily to press the wiper blade, which is fastened on the free end of the articulated part, against the window of the motor vehicle and thereby generate the required pressure force for the wiper blade. The tension spring is connected to the fastening part by a fastening means, which is normally embodied as a C-shaped bracket, which is hooked on the one side in the tension spring and on the other side in a bolt in the fastening part.

In the case of modern windshield wiper devices, it is necessary for the wiper arm to be embodied as flat as possible and, particularly when using so-called non-articulated wiper blades, to be arranged very close to the windshield of the motor vehicle. In addition, these properties are desirable in order to achieve the greatest possible distance between the engine hood of the motor vehicle and the wiper arm. In the case of a pedestrian impacting the engine hood, a minimum distance is often required between the engine hood and the wiper arm as a result so that the engine hood can yield during impact with an absorption of energy in order reduce the risk of injury to the pedestrian.

SUMMARY OF THE INVENTION

The advantage of the wiper arm in accordance with the invention is that it can be embodied to be essentially flatter than previously known wiper arms. This is achieved in that the fastening means features a U-shaped bend, which runs in a plane that runs perpendicular to the plane of the bend of the previous fastening means. As a result, the bend runs in a plane that is perpendicular to the movement plane of the articulated part so that the fastening means only project a little over the lower edges of the fastening part and of the articulated part.

It is especially advantageous if the U-shaped bend has a base and two legs and at least one of the legs features an additional bend on its free end facing away from the base. Because of the additional bend, the fastening means can be fastened to the fastening part in a simple manner.

It is especially advantageous in this case if the fastening part has a free space in which the additional bend engages in order to be able to dispense with a separate fastening element in the fastening part such as a bolt, for example.

The wiper arm can be embodied to be even flatter in an advantageous manner in that the connection of the fastening part to the articulated part is realized as an articulation with a joint bolt and the joint bolt has a recess in the area of the fastening means.

In this case, it is especially advantageous if the recess is embodied radially circumferentially. The wiper arm can be embodied particularly simply and cost effectively with a fastening means made of round wire.

BRIEF DESCRIPTION OF THE DRAWINGS

One exemplary embodiment of the invention is depicted in the drawings and explained in greater detail in the following description.

The drawings show.

DETAILED DESCRIPTION

Figure 1:
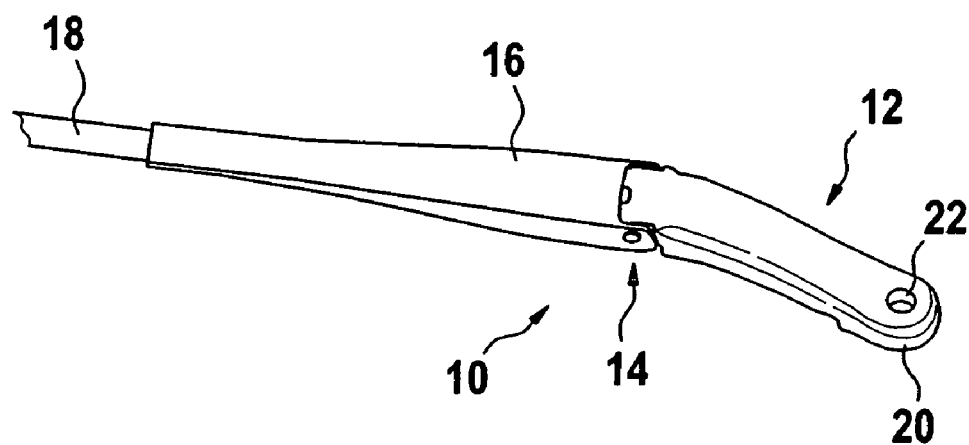
FIG. 1 A perspective representation of a wiper arm in accordance with the invention.

FIG. 1 shows a perspective representation of a wiper arm 10 in accordance with the invention. It is comprised essentially a fastening part 12, which is connected in an articulated manner to an articulated part 16 by means of an articulation 14. On its free end, the articulated part 16 features a rod 18 that is able to carry a wiper blade, which is not shown here for the sake of providing an unimpaired view. Naturally, the wiper blade can also be coupled directly to the free end of the articulated part 16.

The articulated part 16 is embodied as a punched bent part made of sheet metal and has a cross-sectional form that is essentially reverse U-shaped. The fastening part 12 has a longish form and features a first end 20 with a fastening opening 22, which is used to fasten the fastening part 12 to a wiper shaft (not shown) of a windshield wiper device. On the other end of its longitudinal extension, the fastening part 12 is connected in an articulated manner to the articulated part 16 via an articulation 14 so that the articulated part 16 can fold out in a first plane in relation to the fastening part 12. During operation, the wiper arm 10 moves in a pendulum fashion in a second plane that is perpendicular to the first plane.

Figure 2:
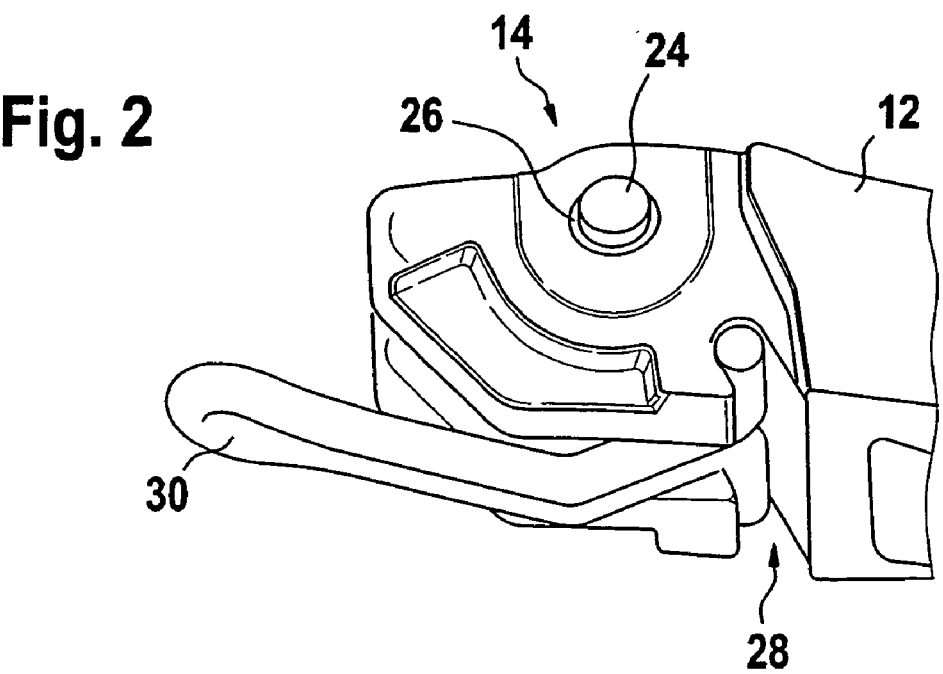
FIG. 2 A perspective representation of the articulation of the fastening part and the fastening means in detail.

FIG. 2 shows a detail of the fastening part 12 in the area of the articulation 14 of a wiper arm 10 in accordance with the invention. The fastening part 12 is embodied as a cast part and has a joint bolt 24 on its end, which bolt is used to connect to the articulated part 16 in an articulated manner. The joint bolt 24 is partially positioned in a sleeve 26, inserted into the fastening part 12 and penetrates it in its entire width. At its ends the joint bolt 24 also penetrates the walls of the U-shaped articulated part 16, which fit snuggly around the fastening part 12, thereby serving as an articulation axis between the articulated part 16 and the fastening part 12.

Figure 3:
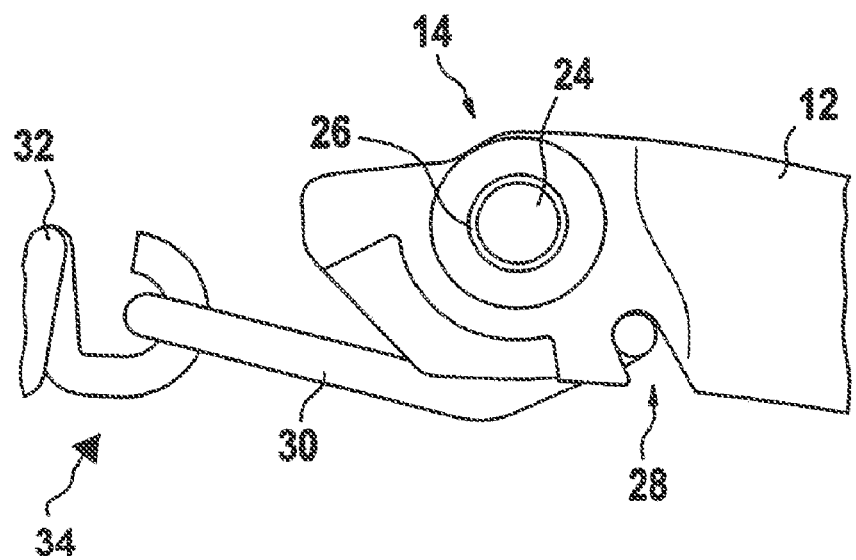
FIG. 3 A side view of the articulation with the fastening means and the tension spring.

On an underside, which in a mounted position faces the window of the motor vehicle, the fastening part 12 has a free space 28, which is embodied as a traverse slot, which penetrates the full width of the fastening part 12 in the area behind the joint bolt 24. In this case, the traverse slot 28 is inclined somewhat in the direction of the articulated part 16. A fastening means 30 sits in this free space 28 and it forms a spring element 34 together with the tension spring 32 (FIG. 3). The spring element is tensioned between the articulated part 16 and the fastening part 12 so that, when the articulated part 16 is folded out from the fastening part 12, the tension spring 32 is stressed. In operation, the spring element 34 serves to press the wiper blade that is coupled to the free end of the rod 18 against the windshield of the motor vehicle constantly during operation.

The fastening means 30 has a longish shape in a longitudinal section and features a slight kink at the height of the joint bolt 24. The purpose of this kink is making a greater fold-out angle possible during replacement of the wiper blade when the articulated part 16 is folded out from the fastening part 12 and the tension spring 32 is tensioned, because otherwise the joint bolt 24 would hit the fastening means 30.

Figure 4:
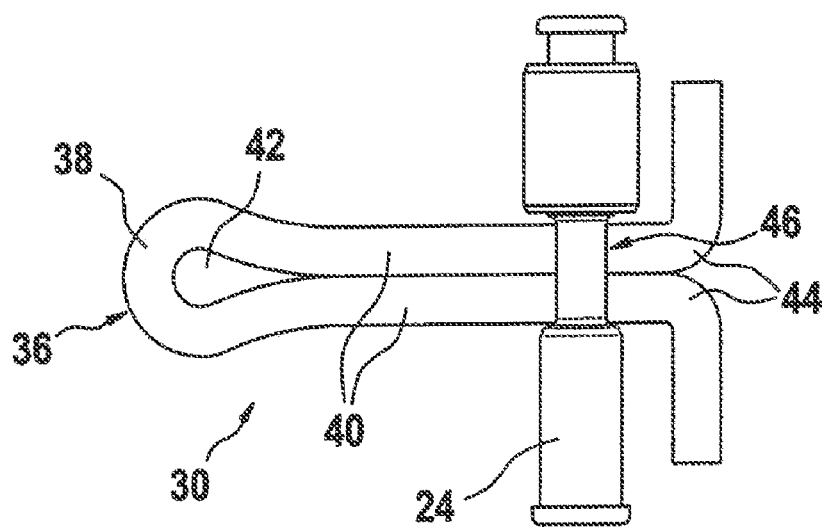
FIG. 4 A detail of the fastening means as well as the joint bolt of a wiper arm in accordance with the invention.

FIG. 4 shows a detail of the fastening means 30 as well as the joint bolt 24 with the sleeve 26. The fastening part 30 has a U-shaped bend 36 with a round base 38 and two legs 40. The legs 40 are arranged directly next to each other so that an eye 42 forms in the area of the bend 36 into which the one end of the tension spring 32 can hook. On the two free ends of legs 40 that face away from the from the basis 38 they are each bent in opposing directions by 90 degrees in the same plane as the bend 36, forming additional bends 44. In this way, because of the two free ends of the legs 40 which are bent in opposing directions, a rod that is arranged approximately parallel to the joint bolt 24 is created, which is inserted into the free space 28 (FIG. 2). In order to increase the range of movement of the fastening means 30, the joint bolt 24 has a radially circumferential recess 46 so that the joint bolt 24 has a somewhat smaller diameter in the area of the fastening means 30. The fastening means in this case is embodied of a round wire, which has a round cross section.

In a variation of the invention, the fastening part 12 can also be embodied as a bent sheet metal part, which is provided with suitable clips to accommodate the free ends of the fastening means 30. In just the same way, the free ends of the fastening means 30 can also be bent in another direction than the one that is shown here. What is crucial is just that the free ends of the two legs 40 of the fastening means 30 are able to engage in a free space of the fastening part 12.

The invention claimed is:

1. Wiper arm (10) for a windshield wiper device for wiping a windshield, the wiper arm comprising at least:
   one elongated fastening part (12) for fastening the wiper arm (10) to the windshield wiper device,
   one articulated part (16), which is connected in an articulated manner to the fastening part (12) so as to be moveable in a first plane,
   one spring element (34), which is arranged between the fastening part (12) and the articulated part (16) and is provided with a tension spring (32) that is stressed during a relative movement between the fastening part (12) and the articulated part (16),
   one fastening means (30) connecting the tension spring (32) to the fastening part (12), characterized in that
   the fastening means (30) has a U-shaped bend (36) in a second plane that is perpendicular to the first plane,
further characterized in that the fastening part (12) has a lower, transverse surface with a width substantially perpendicular to the first plane the fastening part defining a transverse slot (28) extending from the lower, transverse surface and extending through the entire width of the fastening part (12), such that the transverse slot (28) is open at its ends on opposing side surfaces of the fastening part, the fastening part (12) having a length substantially perpendicular to the width and substantially in the first plane, the fastening part (12) defining a longitudinal slot in communication with the transverse slot (28), and
in that the fastening means (30) has a connecting end opposite the bend (36), the connecting end being received in the transverse slot (28) to connect the fastening means (30) to the fastening part (12), a portion of the fastening means (30) being receivable in the longitudinal slot.

2. Wiper arm (10) according to claim 1, characterized in that the U-shaped bend (36) has a base (38) and two legs (40) and at least one of the legs (40) features an additional bend (44) on its free end facing away from the base (38).

3. Wiper arm (10) according to claim 2, characterized in that the additional bend (44) engages in the transverse slot (28) arranged in the fastening part (12).

4. Wiper arm (10) according to claim 3, characterized in that an articulation (14) is provided for connecting the fastening part (12) to the articulated part (16) in the articulated manner, which articulation has a joint bolt (24) that has a recess (46) in the area of the fastening means (30).

5. Wiper arm (10) according to claim 4, characterized in that the recess (46) is embodied radially circumferentially.

6. Wiper arm (10) according to claim 5, characterized in that the fastening means (30) is embodied as a round wire.

7. Wiper arm (10) according to claim 3, characterized in that the fastening means (30) is embodied as a round wire.

8. Wiper arm (10) according to claim 2, characterized in that an articulation (14) is provided for connecting the fastening part (12) to the articulated part (16) in the articulated manner, which articulation has a joint bolt (24) that has a recess (46) in the area of the fastening means (30).

9. Wiper arm (10) according to claim 2, characterized in that the fastening means (30) is embodied as a round wire.

10. Wiper arm (10) according to claim 1, characterized in that an articulation (14) is provided for connecting the fastening part (12) to the articulated part (16) in the articulated manner, which articulation has a joint bolt (24) that has a recess (46) in the area of the fastening means (30).

11. Wiper arm (10) according to claim 10, characterized in that the recess (46) is embodied radially circumferentially.

12. Wiper arm (10) according to claim 11, characterized in that the fastening means (30) is embodied as a round wire.

13. Wiper arm (10) according to claim 11, characterized in that the recess (46) extends fully circumferentially around the joint bolt (24).

14. Wiper arm (10) according to claim 4, characterized in that the fastening means (30) is embodied as a round wire.

15. Wiper arm (10) according to claim 1, characterized in that the fastening means (30) is embodied as a round wire.

16. Wiper arm (10) according to claim 1, characterized in that the fastening part (12) has one end defining an articulation axis for the articulating part (16) and an opposite end, and in that the transverse slot (28) has an opening on the surface, the opening being on the surface between the articulation axis and the opposite end, the transverse slot (28) being inclined from the opening toward the articulation axis.

17. Wiper arm (10) according to claim 16, characterized in that the fastening means (30) has an intermediate part between the bend (38) and the connecting end, the connecting end including a rod portion having rod ends extending outwardly from the intermediate part, the rod portion being received in the transverse slot (28) through the opening to connect the fastening means (30) to the fastening part (12).

18. Wiper arm (10) according to claim 17, characterized in that, when connected to the fastening part (12), the rod portion extends parallel to the articulation axis.

19. Wiper arm (10) for a windshield wiper device for wiping a windshield, the wiper arm comprising:
   an elongated fastening part (12) for fastening the wiper arm (10) to the windshield wiper device,
   an articulated part (16), which is connected in an articulated manner to the fastening part (12) so as to be moveable about an articulation axis in a first plane,
   a spring element (34), which is arranged between the fastening part (12) and the articulated part (16) and is provided with a tension spring (32) that is stressed during a relative movement between the fastening part (12) and the articulated part (16), fastening means (30) connecting the tension spring (32) to the fastening part (12), characterized in that the fastening means (30) has one end connected to the spring (32), an intermediate part, an opposite end connected to the fastening part (12), the opposite end including a rod portion having rod ends extending outwardly from the intermediate part and extending oppositely from one another, and in that the fastening part (12) has one end defining an articulation axis for the articulating part (16) and an opposite end, the fastening part (12) also having a lower, transverse surface with a width substantially perpendicular to the first plane, the fastening part defining a transverse slot (28) extending from an opening on the lower, transverse surface and extending through the entire width of the fastening part (12) such that the transverse slot (28) is open at its ends on opposing side surfaces of the fastening part (12), the opening being on the lower, transverse surface between the articulation axis and the opposite end, the transverse slot (28) being inclined from the opening toward the articulation axis, the rod portion being received in the transverse slot (28) through the opening to connect the fastening means (30) to the fastening part (12), the rod portion extending parallel to the articulation axis.

\* \* \* \* \*